May 5, 1936.  J. B. TIEDEMANN  2,039,754
MACHINE DRIVE
Filed Jan. 31, 1935    6 Sheets—Sheet 4

INVENTOR.
Julius B. Tiedemann
BY
ATTORNEY.

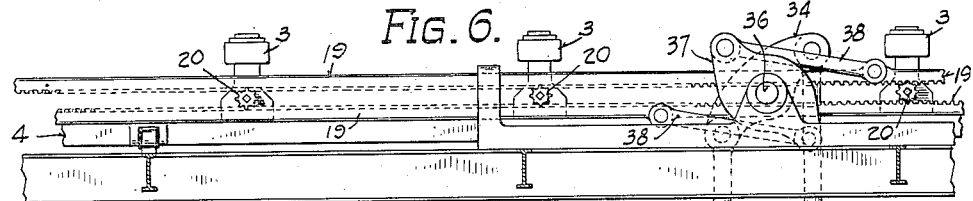
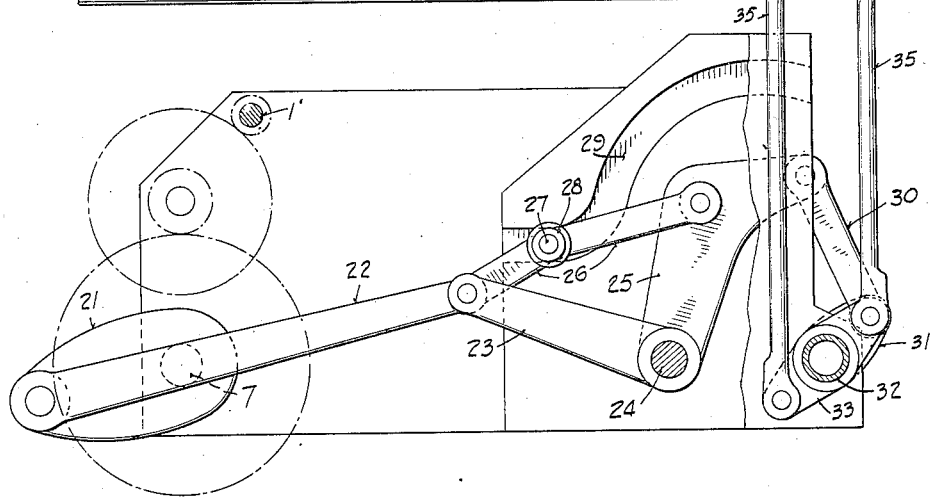
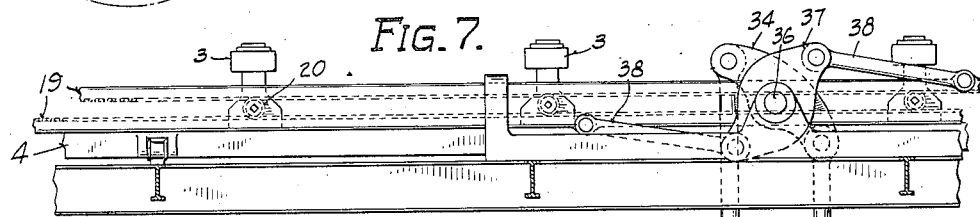
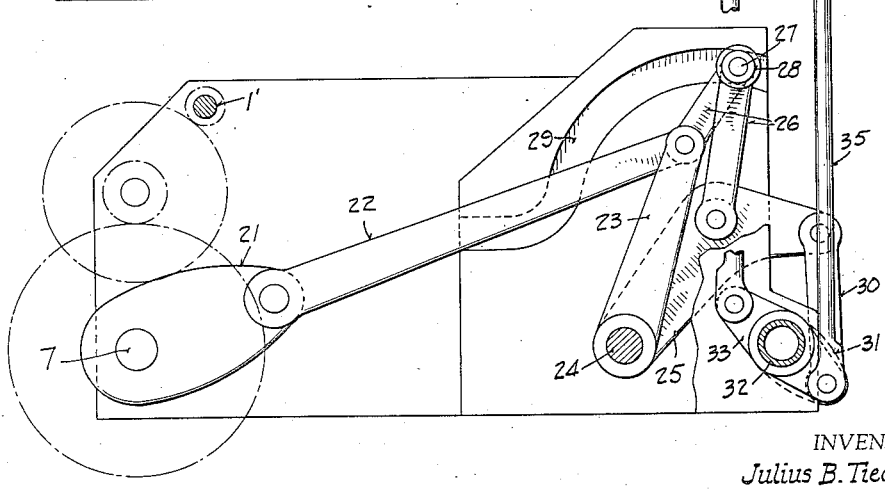

May 5, 1936.　　　J. B. TIEDEMANN　　　2,039,754
MACHINE DRIVE
Filed Jan. 31, 1935　　　6 Sheets-Sheet 6

INVENTOR.
Julius B. Tiedemann

BY
ATTORNEY.

Patented May 5, 1936

2,039,754

UNITED STATES PATENT OFFICE 2,039,754

MACHINE DRIVE

Julius B. Tiedemann, Milwaukee, Wis., assignor to A. O. Smith Corporation, Milwaukee, Wis., a corporation of New York Application January 31, 1935, Serial No. 4,403

12 Claims. (Cl. 29—33)

This invention relates to a machine drive and has been applied to the driving of an automatic plant for assembling and fabricating automobile frames. In this plant there is a conveyor system having work carrying trucks intermittently advanced therealong to successive work stations, and machines such as riveters and forming machines disposed at the various stations for performing work upon the frames. These machines are further adapted to be moved in a body toward and away from the conveyor line. Since the machinery and also the parts being worked upon are of considerable mass, and it is desirable to carry out the various operations rapidly and in proper synchronism, the problem of vibration and strain is important.

The application of the present invention has so reduced or eliminated this difficulty that the plant has nearly doubled its speed of operation with greater safety. To this end the present invention constitutes an improvement over the disclosures of U. S. Letters Patent No. 1,397,020, issued November 15, 1921, to R. Stanley Smith, and No. 1,491,182, issued April 22, 1924, to Birger T. Andren.

The general object of the invention is to decrease the vibration of the machine and increase the efficiency, and at the same time to increase the speed of operation of the machine. A more specific object is to provide a smooth, efficient drive for machines requiring intermittent operations and periods of predetermined dwell in the various operations.

Other objects will appear hereinafter.

One embodiment of the invention is illustrated in the accompanying drawings in which:

Fig. 6 is a similar section showing the drive for the machines in one position of dwell;

Fig. 7 is similar to Fig. 6 showing the drive in the opposite position;

Figure 1:
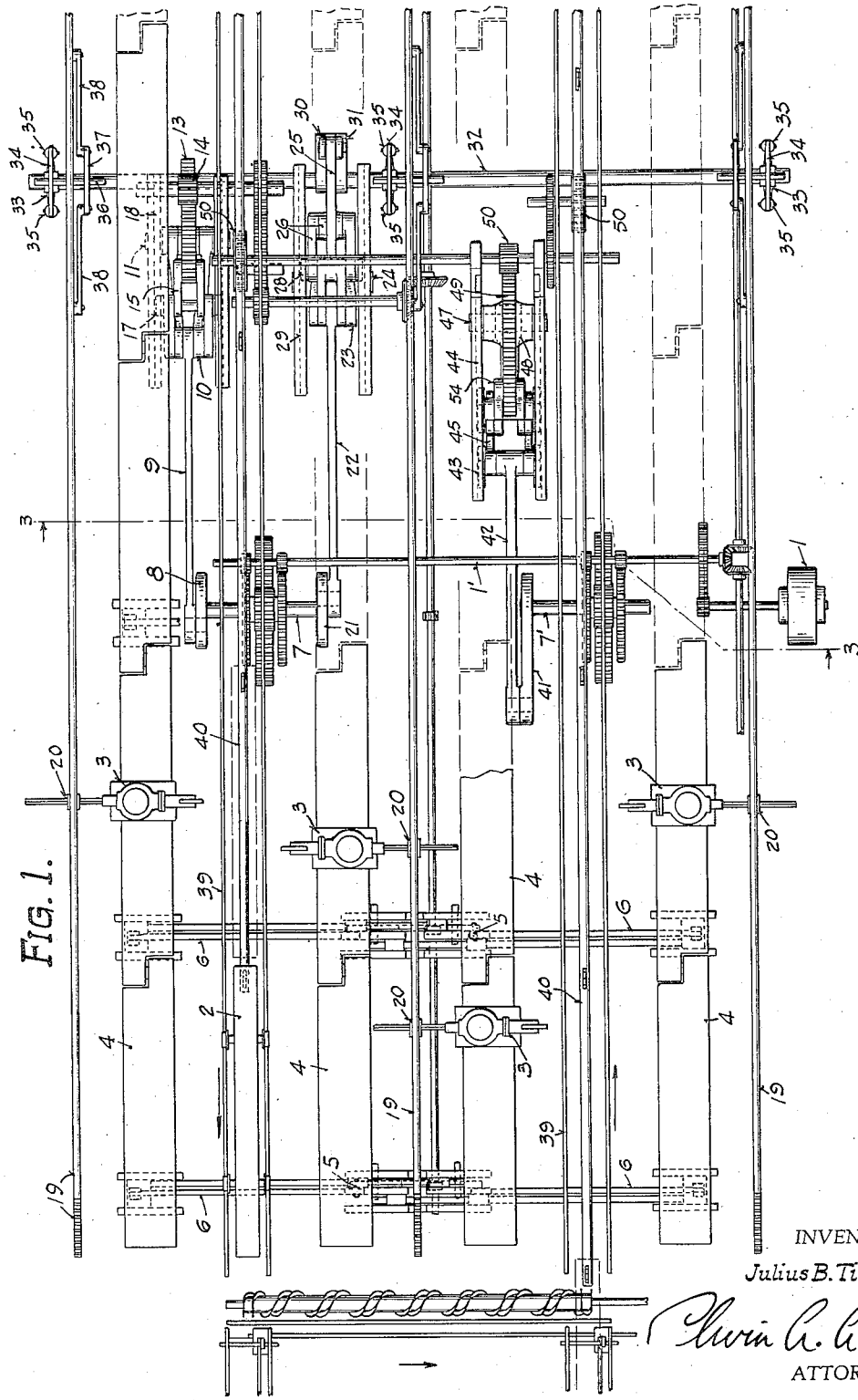
Figure 1 is a top plan view of one end of the fabricating plant.
Figure 2:
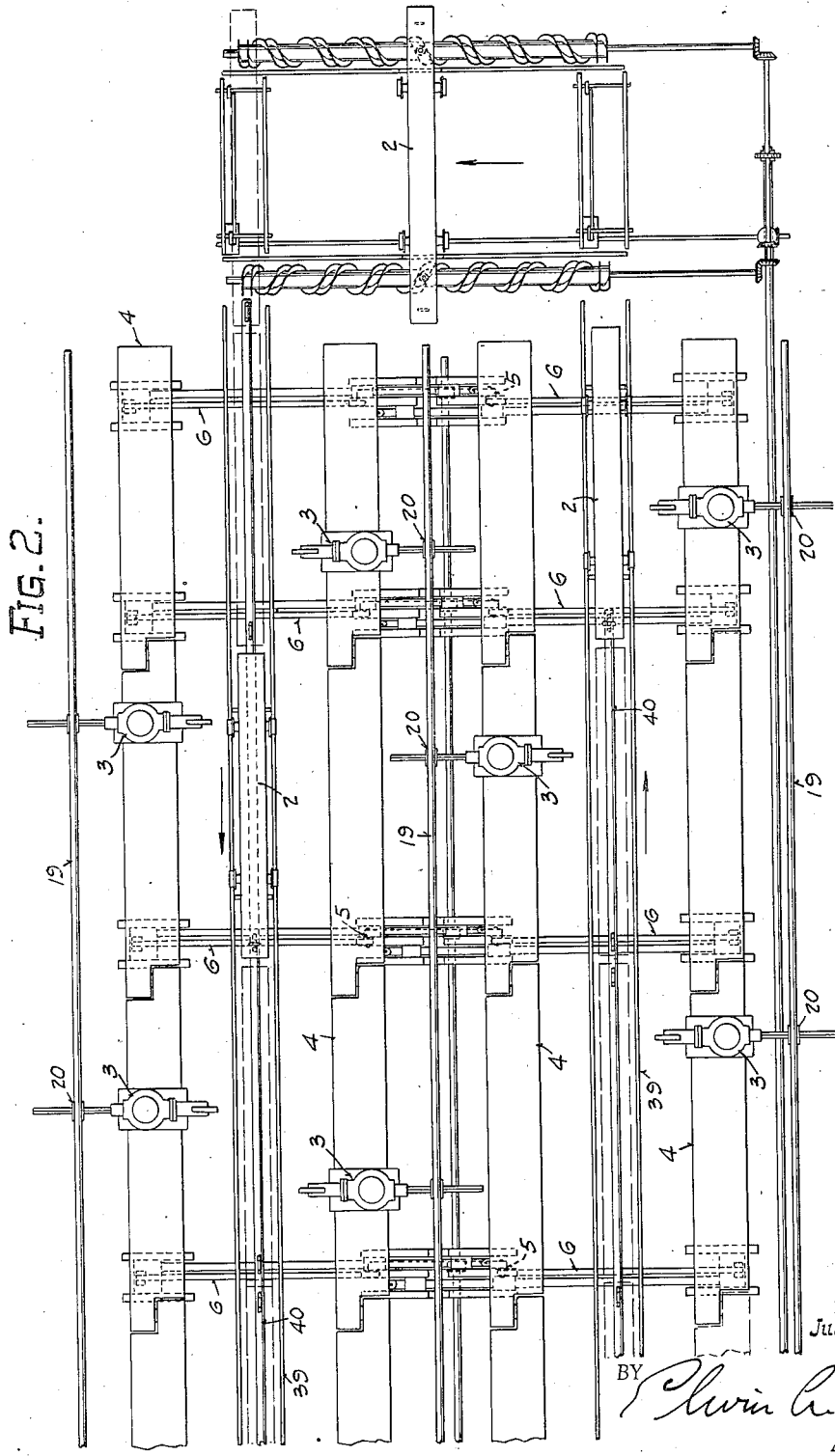
Fig. 2 is a top plan view, complementary to Fig. 1, showing the other end of the plant.

The plant constitutes a single machine having all of its parts driven by a single motor 1. The several parts of the machine consist of the intermittently moving conveyor trucks 2, and the riveters or forming machines 3 disposed in groups at each station of the conveyor. The machines 3 have two different movements: one a lateral movement toward and away from the trucks; the other the operating movement of the machines. Thus, there are generally three distinct movements to be effected in the plant: (1) an intermittent movement of the conveyor trucks 2, (2) the lateral movement of the machines 3, and (3) the operation of the machines themselves. Similar movements of like parts take place simultaneously, but different movements are successive or at least only partially overlapping, so as to provide a complete cycle of operation without interference between the movements of the various parts.

Each different movement has a different period of dwell and also must effect different acceleration and retardation of the parts. Proper balancing of the various dwells and operations as well as the acceleration and retardation of the various masses effects a cushioning which eliminates excessive vibration and waste of energy or power.

The movements will be described more specifically in the following order: (1) lateral movement of the machines, (2) operation of the machines, and (3) conveyor movement.

(1) Lateral movement of the machines

For the purpose of lateral movement the machines 3 are mounted on movable platforms 4 which are moved laterally by means of cranks 5 connected thereto by links 6, as is more specifically set forth and claimed in applicant's copending application, Serial Number 4,404, filed January 31, 1935. The cranks 5 are intermittently rotated in opposite directions through approximately one half a revolution. During each cycle of operation, while the cranks 5 are at one extremity of movement the respective conveyor trucks 2 are moved to the next succeeding station, and while the cranks 5 are at the opposite extremity of movement the machines 3 are operated for performing work upon articles disposed on the trucks 2. Since different operations are performed at the opposite extremities of movement of the cranks 5, the respective dwells of the cranks at such extremities are different. The longer dwell is required during operation of the machines 3 and the shorter dwell during movement of trucks 2.

Figure 4:
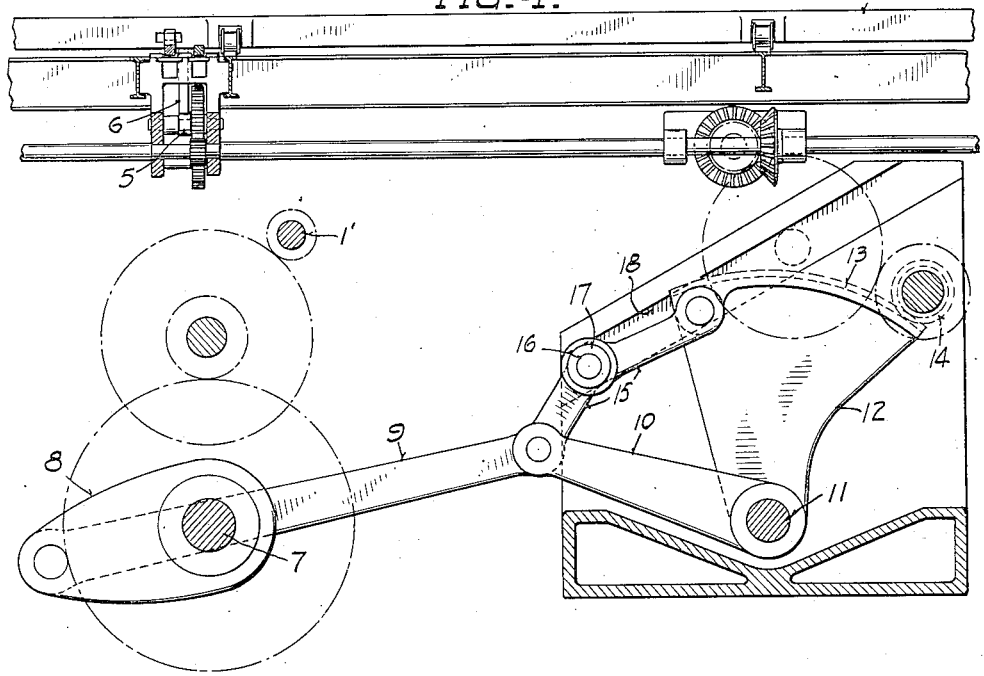
Fig. 4 is a vertical section showing the drive for the machine supports in one position of dwell.
Figure 5:
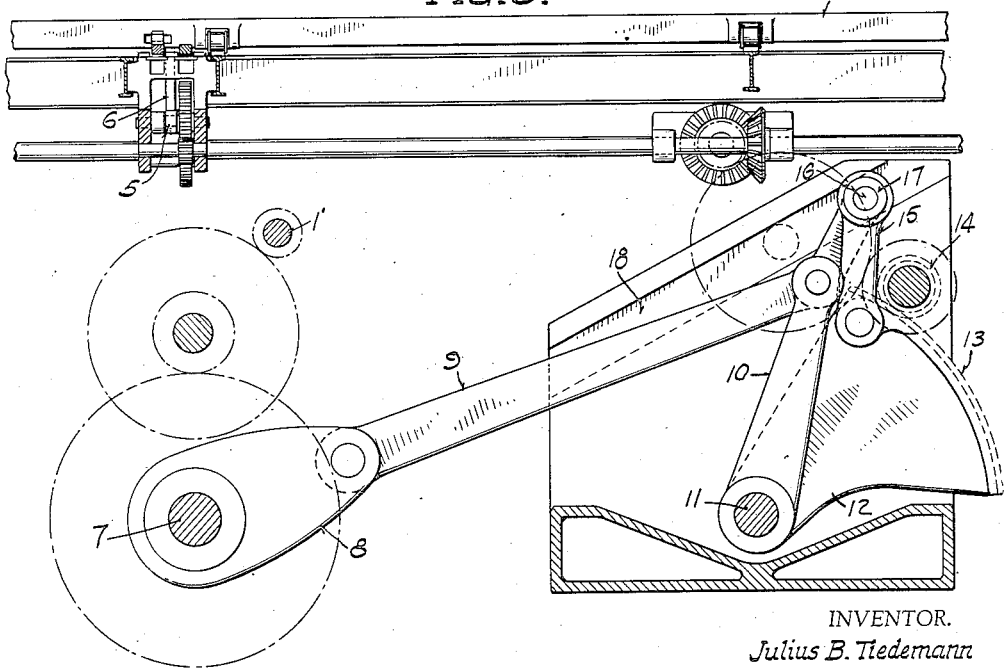
Fig. 5 is similar to Fig. 4 showing the drive in the opposite position.

The apparatus for producing these different dwells and for driving the cranks 5 from the continuously rotating motor 1 is shown in Figures 1, 4 and 5. Referring to these figures, shaft 7 is driven continuously at a predetermined uniform speed by the motor 1 through a train of gears and a main drive shaft 1'. A crank 8 disposed on shaft 7 is connected by means of a long link 9 to an arm 10 having a fixed pivot point 11.

The arm 10 does not rotate through a complete revolution, but reciprocates through only a partial revolution. A second arm 12 is independently pivoted at 11 and has a gear segment 13 at its outer edge. The arms 10 and 12 are preferably of similar length.

Reciprocation of arm 12 through a partial revolution effects reciprocating rotation of cranks 5 by means of a suitable train of gears and shafts including the gear 14 meshing with the gear segment 13. The movement and dwell of arm 12 thus directly determines the movement and dwell of the cranks 5 and, consequently, of the machines 3 on platform 4.

Arm 12 is driven from arm 10 by means of a toggle link 15 having its opposite ends pivoted respectively to arms 10 and 12 and having a central pivotal crosshead 16 provided with rollers 17 riding in a stationary cam track 18.

In the present instance, the cam track 18 is straight and is of sufficient length to accommodate the full stroke of the crosshead 16. The portions of track 18 at the opposite ends of the stroke of crosshead 16 are disposed at different distances from pivot point 11, the farther end of the stroke being farthest from the pivot point. The near end of cam track 18 approximates a distance from pivot point 11 equal to the length of arm 10 while the farther end approximates a distance equal to the sum of the length of arm 10 and of the adjacent link of the toggle link 15. By reason of this disposition of the cam track 18 the toggle link 15 will be approximately open at the near end of its stroke, represented in Fig. 4, and approximately closed at the far end of its stroke, represented in Fig. 5.

The closing of toggle 15 will effect a loss in transmission of movement from arm 10 to arm 12, while during the time toggle 15 is open there will be almost a direct drive of arm 12 by arm 10. As illustrated, the dwell of arm 12 and, consequently, of platforms 4 at the near end of its stroke will be determined largely by the dead center movement of crank 8 and the approach to dead center of arm 10. Cranks 5 will also be at dead center and will thus cooperate in effecting the desired dwell and acceleration and retardation. The dwell of arm 12 at the far end of its stroke will be determined not alone by the dead center of crank 8, but by closing of toggle link 15.

In effect, at the near end of the stroke, as link 9 and arm 10 approach parallelism, the movement of toggle link 15 becomes less and arm 12 is thus retarded. Likewise, at the far end of the stroke, as arm 10 and the adjacent link of toggle 15 approach parallelism there is a loss of transmission of movement to arm 12. The movement might be described as a three-point toggle in which two members approach alignment at one end of the stroke and two other members approach alignment at the other end of the stroke to give the desired lost motion or dwell.

(2) Operation of the machines

Figure 3:
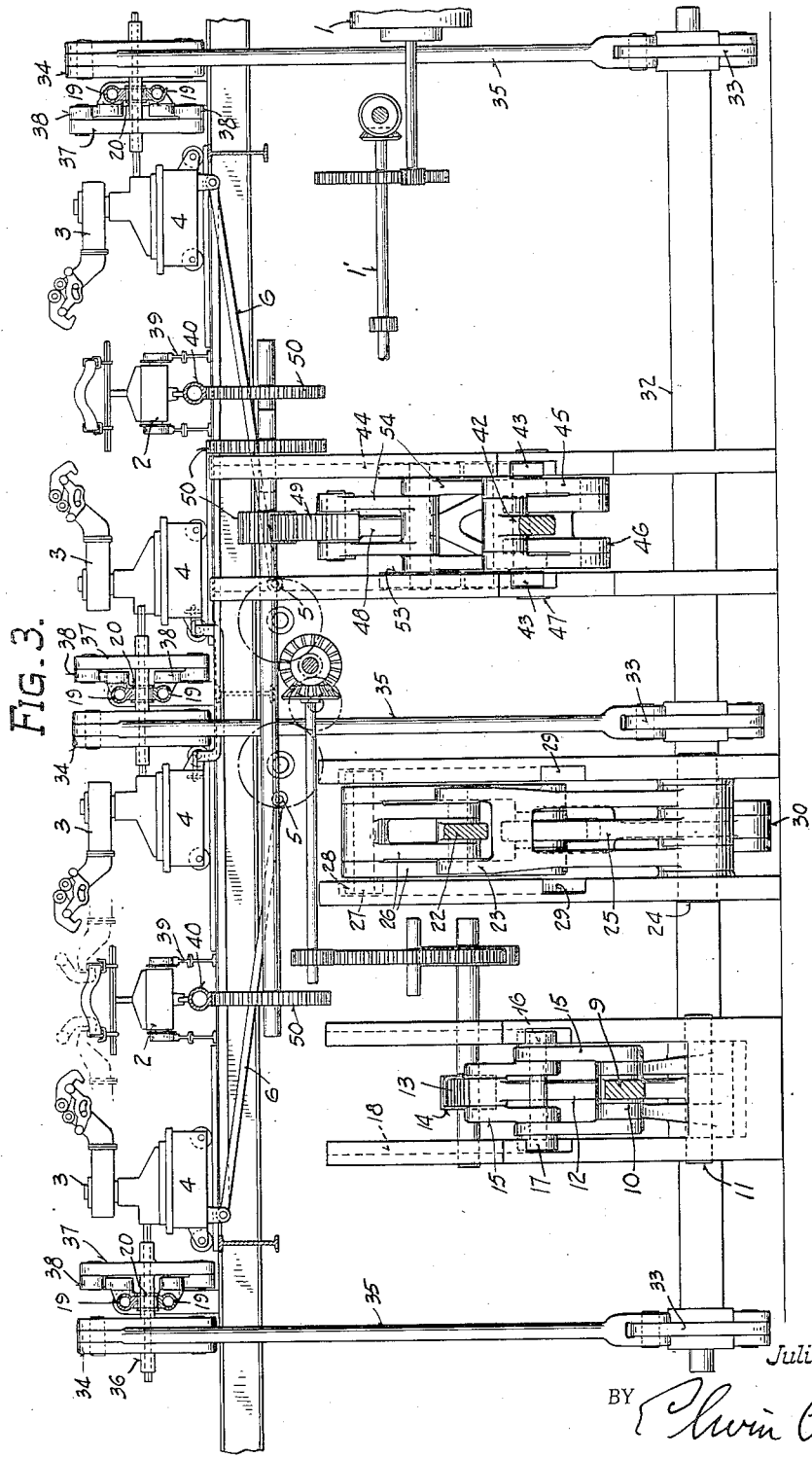
Fig. 3 is a transverse vertical section taken on line 3—3 of Fig. 1.

The machines 3 are all driven simultaneously in a direction for performing work and then reversed to starting position. This is accomplished by oppositely reciprocating racks 19 extending along the conveyor line and individual pinions 20 for driving each machine therefrom, shown in Figures 3, 6 and 7.

The machines operate with practically no dwell between the successive working and reverse movements and then dwell for the rest of the cycle between the reverse and the next working movement while platforms 4 and trucks 1 are moving. Therefore, a single long dwell is provided in each cycle. This is accomplished by means of the mechanism illustrated in Figures 6 and 7.

The constantly rotating shaft 7 driven by motor 1 drives a crank 21. The crank 21 is connected by a link 22 to an arm 23 pivoted at 24. A second arm 25 is also pivoted at 24 and is driven from arm 23 by means of the toggle link 26. The central pivot point 27 of the toggle link 26 constitutes a crosshead having rollers 28 riding in the cam track 29.

Arm 25 is connected by a link 30, crank 31 and shaft 32 to rocker arms 33 which in turn are connected to corresponding rocker arms 34 adjacent the racks 19 by means of parallel links 35. The rocker arms 34 are connected to racks 19 by shafts 36, arms 37 and links 38 to drive the racks in opposite directions to effect rotation of the pinions 20. Thus operation of the machines 3 is effected directly by movement of the arm 25.

The cam track 29, in this instance, is curved to produce the required dwell of arm 25. The dwell being necessary for the major portion of the cycle, the track 29 is curved concentric to the pivotal connection between the link of toggle 26 adjacent to arm 25 and said arm on radius equal to the length of said link, see Fig. 7. In this way there is a complete lost motion for the major portion of the stroke of crank 21 and arm 23. At the near end, however, the track 29 is curved outwardly, thus effecting a rapid movement of arm 25 as the toggle link 26 opens.

(3) The conveyor movement

The trucks 2 travel upon conveyor rails 39 and are intermittently propelled forwardly by a reciprocating drive tube 40 disposed between the rails beneath the trucks. Means are provided for effecting coupling of the trucks 2 to tube 40 when it is to propel the trucks forward and to release the coupling as the trucks reach their respective stations. Means are also provided for indexing each truck at its respective station during operation of machines 3. These coupling and indexing means are shown more fully in applicant's co-pending application above referred to.

The tube 40 moves forward the distance from one station to another for propelling the trucks 2 forwardly and, while the trucks 2 are stationary at the several stations and the machines 3 moving and operating, the tube 40 returns to starting position empty. The return movement of tube 40 has a greater time in the cycle and therefore may be less rapid than the forward stroke.

The size and number of trucks 2 and weight of the work disposed thereon gives a large mass that has to be rapidly moved from station to station. The problem of smooth starting and stopping of this mass and elimination of vibration will be appreciated when it is realized that the entire cycle of the plant is about seven seconds, and the portion of this cycle allotted to the forward movement of the trucks is less than three seconds.

The dwell at each end of the stroke of the tube 40 is about equal, but is relatively unimportant as compared with the smooth rapid operation desired. The power transmission, therefore, is designed to give smooth and rapid movement of the tube. Since the time period of the forward movement of tube 40 is less than one half the total time cycle of revolution of shaft 7¹, and, in fact, is less than three-sevenths of this time cycle, the drive transmission provides a relatively long dwell at each end of the stroke coupled with very rapid acceleration and retardation of movement.

The crank 41 disposed on shaft 7¹ which is rotated similarly to shaft 7, drives a connecting rod 42 which has at its outer end a crosshead 43 disposed to ride in a straight cam track 44 extending in a direction radially from shaft 7¹. The crosshead 43 is connected by a link 45 to a freely pivoting arm 46 pivoted at 47. A second freely pivoted arm 48 also pivoted at 47 is provided with a gear segment 49 which, during its reciprocation, meshes with a train of gears 50 for driving tube 40 by means of a rack 51 on the tube.

The reciprocation of arm 48 through a partial revolution is obtained by a toggle link 52 connecting it to the arm 46. The toggle link 52 has its opposite ends pivoted to the respective arms 46 and 48 and has its central pivot provided with a crosshead 53 which is disposed in cam track 44. The cam track 44 is disposed closer to pivot point 47 than the length of either arms 46 or 48 and is extended equally on opposite sides of the pivot point.

Figure 8:
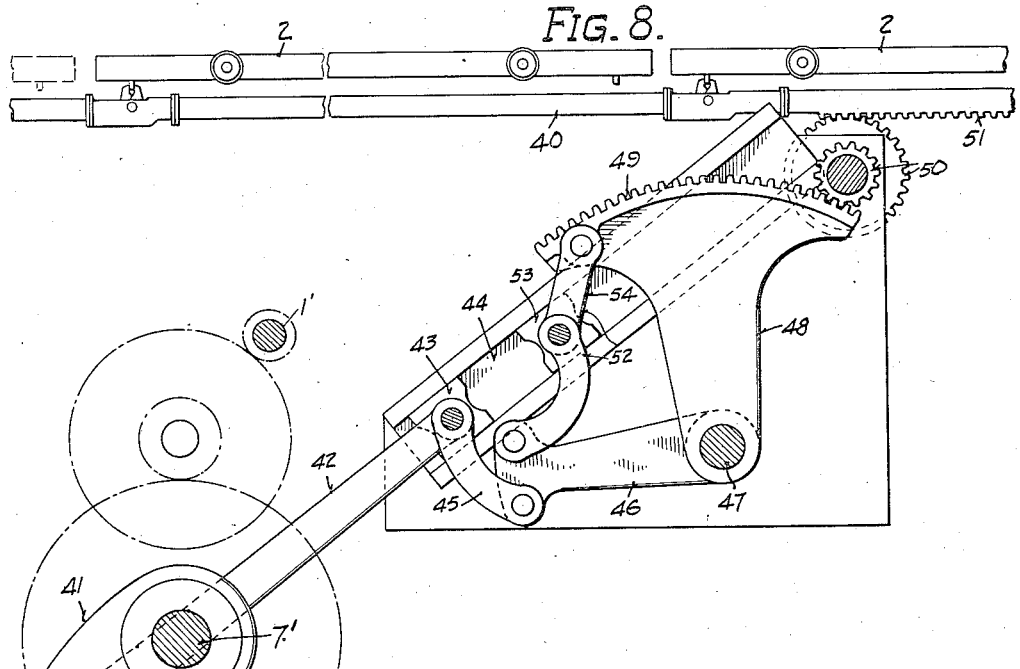
Fig. 8 is a similar section showing the drive for the intermittent advance of the conveyor trucks in one position of dwell.

In Figure 8 it will be noted that when the drive is at the near end of its stroke the link 45 is disposed substantially at right angles to the connecting rod 42 and cam track 44. The crank 41 is also on dead center. By reason of the position of link 45 there is no driving movement transmitted to arm 46 as the crank 41 approaches dead center or leaves dead center. In fact, no substantial driving movement is transmitted until the crank 41 reaches nearly its maximum stroke movement at right angles to dead center.

Figure 9:
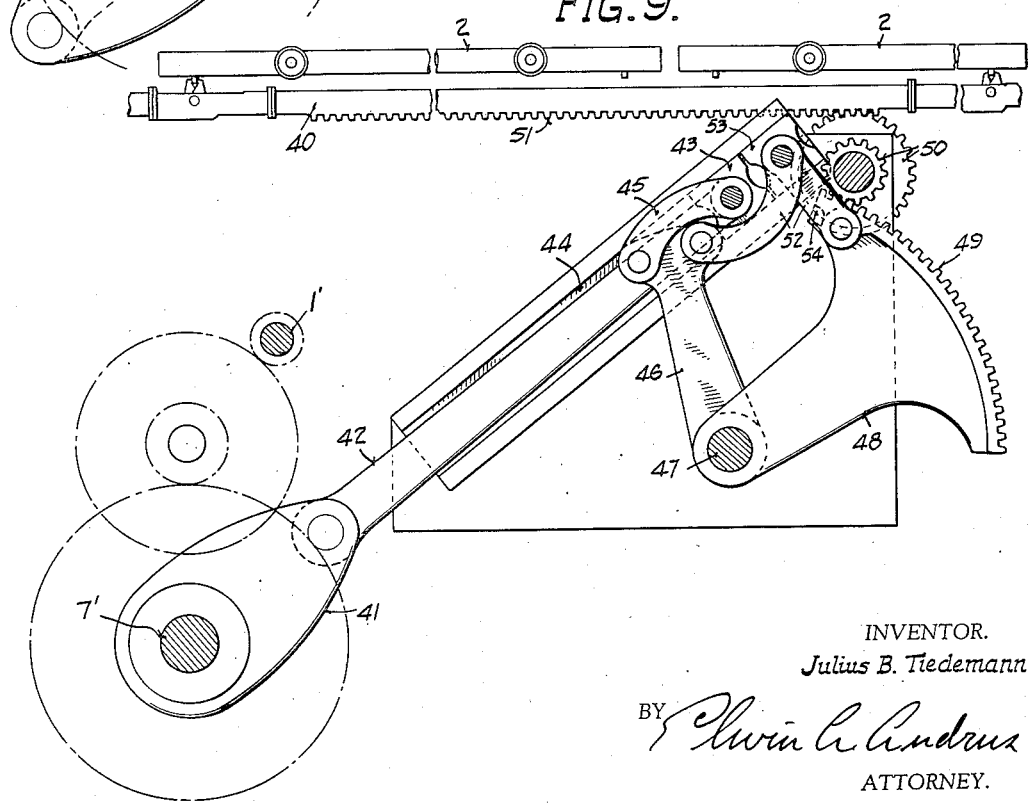
Fig. 9 is similar to Fig. 8 showing the drive in the opposite position.

The same is true at the other end of the stroke shown in Figure 9. There, the link 54 of the toggle 52 is disposed at approximately right angles to connecting rod 42 and cam track 44, and although arm 46 is moved by crank 41, there is no transmission of movement from arm 46 to arm 48. Therefore, for a predetermined distance on either side of the dead center of crank 41 there is no movement of arm 48 and, consequently, no reciprocation of tube 40.

The acceleration and retardation of movement is greater than it would be if made directly proportional to the stroke of crank 41. The maximum speed reached is that of crank 41 as it reaches a position at right angles to its dead center, and on either side of this position the acceleration and retardation are increased to give a shorter time cycle of operation to tube 40.

The relative positioning of cranks 8 and 21 on shaft 7 and crank 41 on shaft 7¹, which shafts are rotated from the single motor 1, determines the relative time cycle of each movement in the plant, and the cooperation of the several drives insures the proper timing of the various movements. The entire plant thus operates as a single machine.

I claim:

1. In a machine, a plurality of parts requiring distinctly different movements in timed synchronism in a cycle of operation, a plurality of constantly rotating cranks respectively providing a source of power for each of said movements of parts, and means disposed between each of said cranks and its respective driven part for effecting synchronized reciprocating movement of the latter at periods different from the normal reciprocatory drive of said cranks.

2. In a machine, a plurality of parts requiring distinctly different movements in timed synchronism in a cycle of operation, a plurality of constantly rotating cranks respectively providing a source of power for each of said movements of parts, and means disposed between each of said cranks and its respective driven part for effecting synchronized reciprocating movement of the latter at periods different from the normal reciprocatory drive of said cranks, said cranks being rotated by a single common rotating drive shaft and at relative angular positions for effecting successive relative working operations of the several parts, each part being substantially in a period of dwell during operation of the other parts.

3. In a machine of the class described, a conveyor for presenting articles to successive work stations, a plurality of work performing machines at said stations, a constantly rotating drive shaft, a rotating crank driven by said shaft for moving said conveyor intermittently, a rotating second crank driven by said shaft for operating said machines, and means disposed between each of said cranks and its respective driven elements for increasing the rate of acceleration and retardation in synchronous movement of said elements in relative alternate timed relation.

4. In a machine of the class described, a conveyor for presenting articles to successive work stations, a plurality of work performing machines at said stations, a constantly rotating drive shaft, a crank driven by said shaft for moving said conveyor intermittently, a second crank driven by said shaft for operating said machines, a third crank driven by said shaft for moving said machines relatively toward and away from the work, and means disposed between each of said cranks and its respective driven elements for increasing the rate of acceleration and retardation in synchronous movement of said elements in relative alternate timed relation.

5. In a machine of the class described, a conveyor for presenting articles to successive work stations, a plurality of work performing machines at said stations, a constantly rotating drive shaft, a crank rotated by said shaft for driving said conveyor intermittently, a second crank rotated by said shaft for operating said machines, a third crank rotated by said shaft for moving said machines relatively toward and away from the work, and means disposed between each of said cranks and its respective driven elements for increasing the rate of acceleration and retardation in synchronous movement of said elements in relative alternate timed relation, each of said means comprising a pivoted lever arm connected to receive reciprocative rotary movement from the respective crank arm, a second pivoted lever arm disposed for reciprocative rotary movement and connected to the respective driven element, a toggle link connecting said pivoted lever arms, and a stationary guide for controlling the opening and closing of said toggle link during reciprocation of said first-named lever arm to effect predetermined reciprocation of said second-named lever arm.

6. In a machine of the class described, a conveyor for presenting articles to successive work stations, a plurality of work performing machines at said stations, a constantly rotating drive shaft, a crank rotated by said shaft for driving said conveyor intermittently, a second crank rotated by said shaft for operating said machines, a third crank rotated by said shaft for moving said machines relatively toward and away from the work, and means disposed between each of said cranks and its respective driven elements for increasing the rate of acceleration and retardation in synchronous movement of said elements in relative alternate timed relation, each of said means comprising a pivoted lever arm connected to receive reciprocative rotary movement from the respective crank arm, a second pivoted lever arm disposed for reciprocative rotary movement and connected to the respective driven element, a toggle link connecting said pivoted lever arms, and a stationary guide for controlling the opening and closing of said toggle link during reciprocation of said first-named lever arm to effect predetermined reciprocation of said second-named lever arm, one of said means providing an extended dwell in movement of its driven element at each end of its stroke.

7. In a machine of the class described, a conveyor for presenting articles to successive work stations, a plurality of work performing machines at said stations, a constantly rotating drive shaft, a crank rotated by said shaft for driving said conveyor intermittently, a second crank rotated by said shaft for operating said machines, a third crank rotated by said shaft for moving said machines relatively toward and away from the work, and means disposed between each of said cranks and its respective driven elements for increasing the rate of acceleration and retardation in synchronous movement of said elements in relative alternate timed relation, each of said means comprising a pivoted lever arm connected to receive reciprocative rotary movement from the respective crank arm, a second pivoted lever arm disposed for reciprocative rotary movement and connected to the respective driven element, a toggle link connecting said pivoted lever arms, and a stationary guide for controlling the opening and closing of said toggle link during reciprocation of said first-named lever arm to effect predetermined reciprocation of said second-named lever arm, one of said means providing a period of dwell in movement of its driven element at one end of its stroke greater than the corresponding period of dwell at the other end of the stroke.

8. In a machine of the class described, a conveyor for presenting articles to successive work stations, a plurality of work performing machines at said stations, a constantly rotating drive shaft, a crank rotated by said shaft for driving said conveyor intermittently, a second crank rotated by said shaft for operating said machines, a third crank rotated by said shaft for moving said machines relatively toward and away from the work and means disposed between each of said cranks and its respective driven elements for increasing the rate of acceleration and retardation in synchronous movement of said elements in relative alternate timed relation, each of said means comprising a pivoted lever arm connected to receive reciprocative rotary movement from the respective crank arm, a second pivoted lever arm disposed for reciprocative rotary movement and connected to the respective driven element, a toggle link connecting said pivoted lever arms, and a stationary guide for controlling the opening and closing of said toggle link during reciprocation of said first-named lever arm to effect predetermined reciprocation of said second-named lever arm, and each of said means providing a period of dwell in movement of its driven element and a rate of acceleration and retardation of such movement different from that normally produced by the crank.

9. In a machine of the class described, in combination with a device disposed for reciprocation, a constantly rotating drive shaft, a crank rotated by said shaft for driving said reciprocating device, and means interposed between said crank arm and said device comprising a pivoted lever arm connected to receive reciprocative rotary movement from said crank, a second pivoted lever arm disposed for reciprocative rotary movement and connected to drive said device, said lever arms having a common pivot point, a toggle link connecting said lever arms and having a central hinge pivot, a straight stationary cam track disposed at right angles to the common pivot point of said lever arms and in the path of movement of said toggle link, and means for causing said central hinge pivot of said toggle link to follow said straight cam track to effect opening and closing movement of said toggle link during reciprocation of said first-named lever arm.

10. In a machine of the class described, in combination with a device disposed for reciprocation, a constantly rotating drive shaft, a crank rotated by said shaft for driving said device, a cam track disposed at right angles to said shaft and extending substantially radially therefrom, a link pivoted at one end to said crank and at its other end to a second link, the common pivot point of said links being disposed to follow said cam track, an arm having a stationary pivot at one end and being pivoted to said second link at the other to be reciprocated thereby, said arm and stationary pivot being positioned to effect positioning of said second link at right angles to said cam track during a portion of the rotation of said crank to produce a predetermined dwell in the movement of said arm, and means connecting said arm to said reciprocating device to drive the same.

11. In a machine of the class described, in combination with a device disposed for reciprocation, a constantly rotating drive shaft, a crank rotated by said shaft for driving said device, a cam track disposed at right angles to said shaft and extending substantially radially therefrom, a link pivoted at one end to said crank and at its other end to a second link, the common pivot point of said links being disposed to follow said cam track, an arm having a stationary pivot at one end and being pivoted to said second link at the other to be reciprocated thereby, a second arm pivoted at the stationary pivot point of said first-named arm, a toggle link connecting said pivoted arms and having a central hinge pivot, means for causing said central hinge pivot to follow the path of said cam track during reciprocation, said cam track being disposed relative to said stationary pivot for said arms to effect a positioning of said second-named link substantially at right angles thereto at one end of the stroke of said first-named link and to effect a positioning of the toggle link adjacent said second arm substantially at right angles to said cam track at the other end of the stroke of said first-named link to thereby extend the dwell in movement of said second-named lever between successive reciprocations, and means for transmitting the movement of said second-named lever to said reciprocating device to drive the same.

12. In a machine of the class described, in combination with a device disposed for reciprocation, a constantly rotating crank for driving said device, and means disposed between said crank and device for effecting a modified reciprocative movement of said device different from that which would normally be produced by said crank, said means comprising an arm having a stationary pivot point and disposed for reciprocative rotary movement, a toggle link connecting said arm and crank, a second toggle link connecting said arm to driving means for said device, and a guide disposed in the path of reciprocation of said toggle links for effecting predetermined alternate opening and closing of said links during reciprocation thereof.

JULIUS B. TIEDEMANN.